(12) United States Patent
Robson

(10) Patent No.: US 8,718,635 B2
(45) Date of Patent: May 6, 2014

(54) OPTIMIZING NEIGHBOR LISTS

(75) Inventor: Julius Robson, Paris (FR)

(73) Assignee: Apple Inc., Cupertino, CA (US)

( * ) Notice: Subject to any disclaimer, the term of this patent is extended or adjusted under 35 U.S.C. 154(b) by 928 days.

(21) Appl. No.: 12/138,734

(22) Filed: Jun. 13, 2008

(65) Prior Publication Data

US 2009/0264118 A1 Oct. 22, 2009

(30) Foreign Application Priority Data

Apr. 22, 2008 (EP) ..................................... 08300189

(51) Int. Cl.
*H04W 36/00* (2009.01)
(52) U.S. Cl.
USPC ........ 455/423; 455/422.1; 455/424; 455/425; 455/436; 455/437; 455/438; 455/439; 455/440; 455/441; 455/442; 455/443; 455/444
(58) Field of Classification Search
USPC .................. 455/422.1, 423–425, 436–444
See application file for complete search history.

(56) References Cited

U.S. PATENT DOCUMENTS

2009/0124262 A1* 5/2009 Vela et al. ..................... 455/442
2011/0009157 A1* 1/2011 Osterling et al. ............. 455/522

* cited by examiner

*Primary Examiner* — Patrick Edouard
*Assistant Examiner* — Matthew Genack
(74) *Attorney, Agent, or Firm* — Meyertons, Hood, Kivlin, Kowert & Goetzel, P.C.

(57) ABSTRACT

The present invention relates to a method of generating neighbor lists in a radio communication network comprising user terminals and base stations defining sectored or omnidirectional radio cells, where communication between user terminals and base stations is arranged to take place over radio channels. The method comprises the steps of: (a) receiving radio channel measurements from at least some of the user terminals; (b) creating a first table by using the measurements received from the user terminals, the first table comprising for at least some of the user terminals the corresponding radio channel measurement in relation to different radio cells; (c) processing the first table to generate a cell coupling matrix indicative of a radio coupling figure between different pairs of cells in the network; and (d) for a certain cell obtaining a neighbor list by determining the radio channel neighbors to be the cells of which the coupling figure with the cell in question is greater than a given threshold.

14 Claims, 3 Drawing Sheets

| | Cell | | | | | |
|---|---|---|---|---|---|---|
| User | 1a | 1b | 1c | 2a | 2b | 2c |
| 1 | -43 | -77 | -62 | -56 | -66 | -80 |
| 2 | -38 | -47 | -96 | -13 | -79 | -69 |
| 3 | -35 | -43 | -85 | -22 | -34 | -64 |
| 4 | -15 | -65 | -42 | -39 | -84 | -76 |
| 5 | -39 | -95 | -40 | -36 | -69 | -39 |
| 6 | -85 | -44 | -13 | -80 | -68 | -13 |
| ⋮ | ⋮ | ⋮ | ⋮ | ⋮ | ⋮ | ⋮ |
| N | -4 | -63 | -15 | -72 | -83 | -92 |

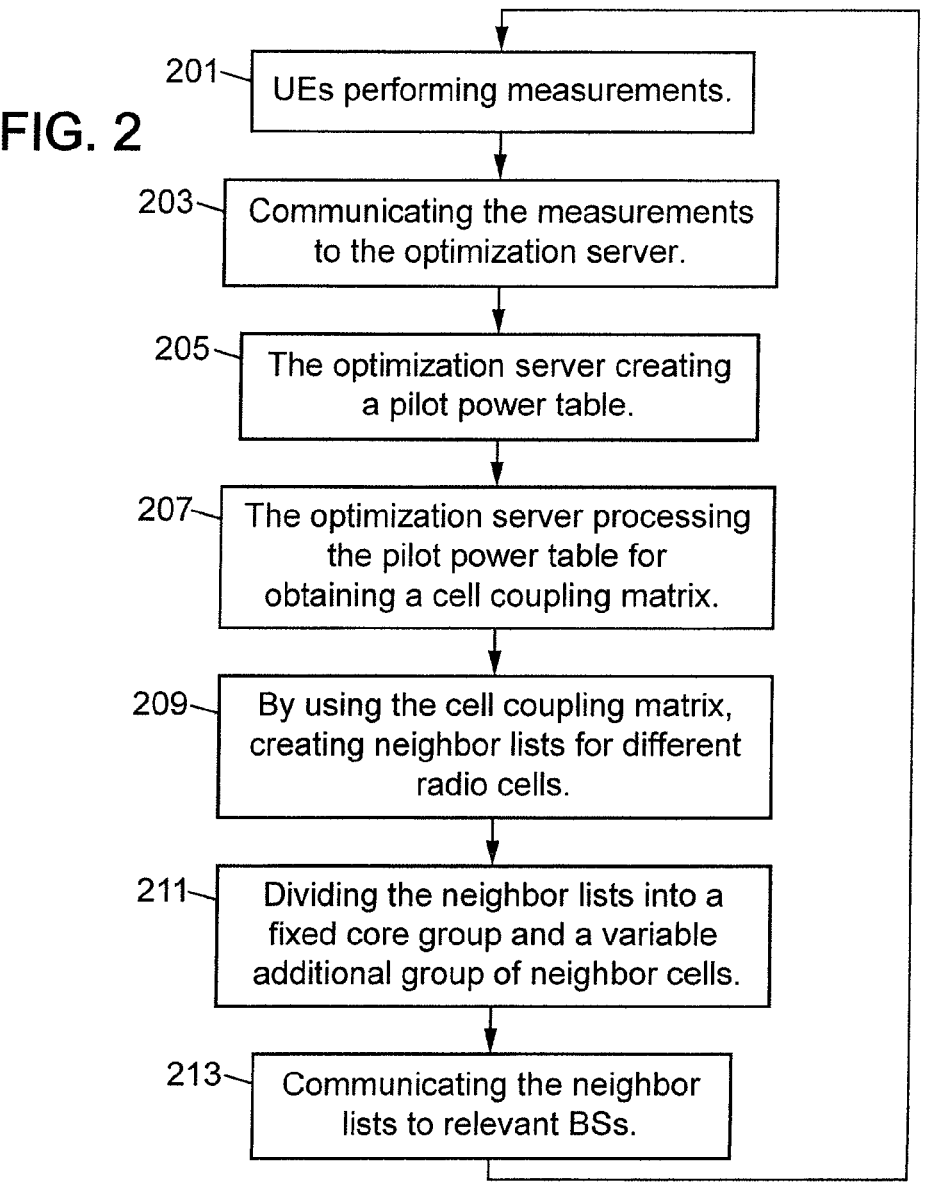
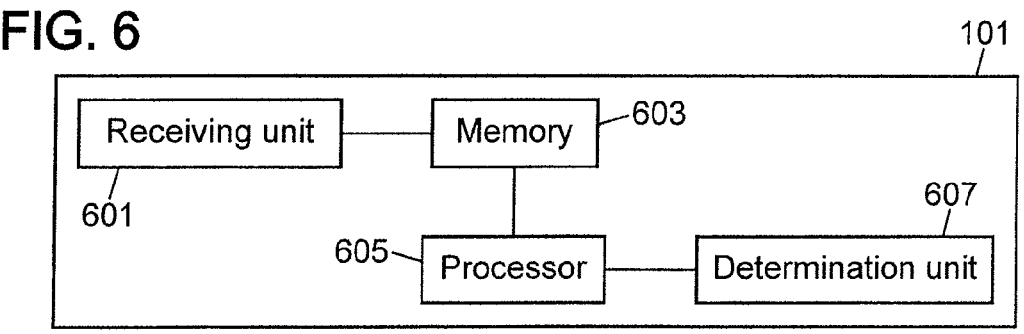

OPTIMIZING NEIGHBOR LISTS

FIELD OF THE INVENTION

The present invention relates to a method of optimizing neighbor lists maintained in base stations that operate in cellular radio communication networks. The invention equally relates to a corresponding computer program product and to an optimization server capable of carrying out the method.

BACKGROUND OF THE INVENTION

In radio communication networks each base station usually holds a neighbor list of nearby transceivers, to which user equipments (UEs) might hand over the ongoing radio connection as they move. Such a list may for instance indicate the most suitable radio channels that need to be considered when performing a handover.

In many systems including universal mobile communication system (UMTS) and other systems based on code division multiple access (CDMA) scheme it is not practical for UEs to scan all possible channels or ID codes to find potential neighbors fast enough. Therefore, the neighbor list is downloaded from the serving transceiver, i.e. the serving base station, which gives information on where to listen out for neighbors, in terms of channels or CDMA code offsets, etc.

Neighbor lists are currently generated with a skilled manual process, looking at maps to visually identify adjoining sectors. Lists then have to be tuned to remove the neighbors that are never used and to add unlisted neighbors that may arise through anomalous propagation. Current tuning methods require skilled experts to identify neighbors on a map, followed by a costly and time consuming tuning process involving drive testing. Lists should be updated after any changes in the network such as adding new cell sites, or changes to RF parameter settings such as power or downtilt. Propagation and traffic conditions also change over time. Thus, the manual optimization is rather costly and time-consuming. Furthermore, drive tests can never be fully representative of where users really are, since most calls are made indoors.

The optimization process gets even more complicated if wireless networks with many different protocols are organized to work together. For instance, there may be a legacy 2G network, with smaller areas of 3G coverage plus a data overlay and occasional WiFi hotspots. It will be too complex a task to manually identify and maintain neighbor lists between all these types of access. Even though, after tuning, the final results are often acceptable, a significant effort is required. It is also necessary to keep lists up-to-date as changes occur in networks. Future wireless networks will be highly complex and interlinked, so manual methods may not be feasible. Therefore, better methods will be needed.

SUMMARY OF THE INVENTION

One object of the invention is to overcome the above-identified deficiencies. More specifically, a new automated method for establishing a neighbor list in a radio communication network has been invented.

The invention also aims to improve handover mechanisms of a UE from one serving radio transceiver to another in a wireless network.

According to a first aspect of the invention there is provided a method of generating neighbor lists in a radio communication network comprising user terminals and base stations defining sectored or omnidirectional radio cells, where communication between user terminals and base stations is arranged to take place over radio channels, the method comprising the steps of:
receiving radio channel measurements from at least some of the user terminals;
creating a first table by using the measurements received from the user terminals, the first table comprising for at least some of the user terminals the corresponding radio channel measurement in relation to different radio cells;
processing the first table to generate a cell coupling matrix indicative of a radio coupling figure between different pairs of cells in the network; and
for a certain cell obtaining a neighbor list by determining the radio channel neighbors to be the cells of which the coupling figure with the cell in question is greater than a given threshold.

The invention in accordance with an embodiment provides the advantage that it automates the optimization of neighbor lists based on data already available from users of the networks. Automatically generated lists should also offer superior performance, as they can be kept up-to-date and as they are based on the real user traffic distribution rather than a drive test route. The measurement data is fully representative of the places where users actually make the calls (mostly indoors), unlike the drive tests which are only made along selected roads. The data can also be gathered at all times of the day. A drive test only represents a snapshot in time and may miss some problems which only occur at other times. Moreover, the data that is automatically gathered is free. Thus, the invention can be considered as providing a method of automatically generating neighbor lists by processing of data provided by users of the networks, rather than from costly drive testing.

According to a second aspect of the invention, there is provided a computer program product comprising instructions for implementing the method according to the first aspect of the invention.

According to a third aspect of the invention there is provided an optimization server for generating neighbor lists in a radio communication network comprising user terminals and base stations defining sectored or omnidirectional radio cells, where communication between user terminals and base stations is arranged to take place over radio channels, the optimization server comprising means for:
receiving radio channel measurements from at least some of the user terminals;
creating a first table by using the measurements received from the user terminals, the first table comprising for at least some of the user terminals the corresponding radio channel measurement in relation to different radio cells;
processing the first table to generate a cell coupling matrix indicative of a radio coupling figure between different pairs of cells in the network; and
obtaining a neighbor list for a certain cell by determining the radio channel neighbors to be the cells of which the coupling figure with the cell in question is greater than a given threshold.

Other aspects of the invention are recited in the claims appended hereto.

BRIEF DESCRIPTION OF THE DRAWINGS

Other features and advantages of the invention will become apparent from the following description of non-limiting exemplary embodiments, with reference to the appended drawings, in which:

FIG. 2 is a flow chart illustrating a method in accordance with an embodiment of the present invention;

FIG. 6 is a simplified block diagram of an optimization server.

DETAILED DESCRIPTION OF AN EMBODIMENT OF THE INVENTION

One embodiment of the invention will next be described in the context of a cellular radio communication network, such as a UMTS. It is to be noted that the following exemplary embodiment is only illustrative and many alterations in the described embodiment are possible.

Figures 1, 3:
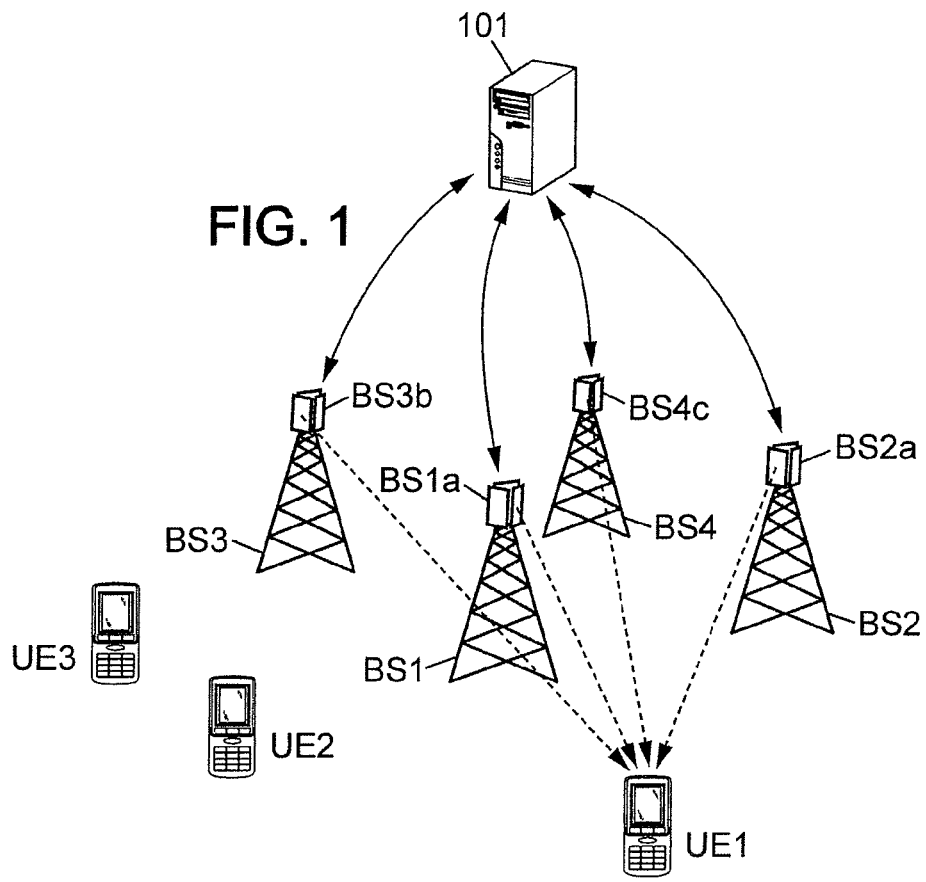
FIG. 1 is a simplified schematic representation of a communication network where the embodiments of the invention can be applied.
FIG. 3 shows a pilot power table in accordance with an embodiment of the present invention.

In FIG. 1 there are shown three UEs (UE1, UE2 and UE3) operating in a cellular communication network. There are also shown four BSs (BS1, BS2, BS3 and BS4), also known as node Bs in UMTS, serving the UEs by providing necessary radio channels. An optimization server 101 is also provided for generating neighbor lists in accordance with the invention as will be explained later in more detail. For simplicity only these units are shown in FIG. 1. Other elements that are not relevant for understanding the teachings of the present invention are not shown in FIG. 1, but a skilled person readily understands that a communication network also comprises other elements.

In FIG. 1, each BS site has three sector antennas, each facing in a different direction. Thus, each BS serves three sectored cells to increase capacity of the network. In FIG. 1 these cells are referred to as BS1a, BS1b, BS1c, BS2a, etc. The UEs operating in the network are then capable of distinguishing the signals received from different antennas, based on the principles of multiple access such as FDMA, CDMA, OFDMA, etc. techniques as is well known in the art.

One embodiment of the invention is described in more detail with reference to the drawings and the flow chart of FIG. 2. First in step 201 the UEs perform radio channel measurements. In this example they measure pilot signal powers. In UMTS the pilot signals are broadcast by the BSs on common pilot channel (CPICH) with constant power and of a known bit sequence. Its power is usually between 5% and 15% of the total BS transmit power. The UEs regularly measure pilots of the sectors specified in their current neighbor list.

Once the measurements have been done, the UEs communicate in step 203 these measurements to the optimization server 101 so that the measurements are first received by the BSs which forward the measurements further to the optimization server 101. In step 205 the optimization server 101 creates a pilot power table (PPT) shown in FIG. 3, based on the measurements received from the UEs. The PPT is an array of pilot powers with a row for each UE reporting a measurement, and a column for each sector or cell in the network. It is not essential to have measurements from all UEs at all sectors. Where measurements are missing, the optimization server 101 can assume a measurement of low strength, quality etc. Both CDMA and UMTS protocols have signaling to report the measured values back to the BSs.

Figure 4:
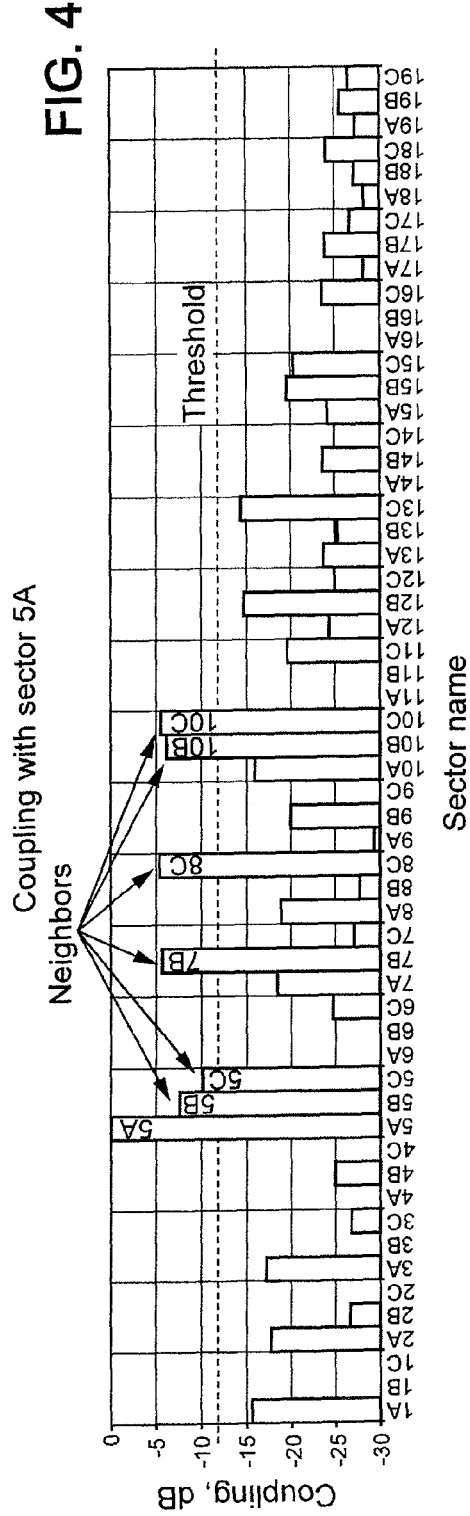
FIG. 4 shows one vector from a cell coupling matrix, in accordance with an embodiment of the present invention.

Once the PPT has been created, in step 207 it can be converted into a cell coupling matrix (CCM), part of which is illustrated in FIG. 4. FIG. 4 actually only shows in a graphical form a single row of the CCM. The CCM gives a coupling figure for every possible pair of radio cells in the network (or part of the network). In the CCM, a single row is a list of couplings for a particular radio cell. In the example of FIG. 4, the cell couplings are shown for a cell 5a, i.e. BS5a (not shown in FIG. 1).

From the PPT, for each UE served by a given cell, the optimization server 101 calculates and stores the relative strength of signals from other cells, compared to the serving signal. Then for each pair of cells, the resulting data is the distribution of relative signal strengths. In this example the cell coupling between any two cells is the 90%ile from the distribution. It is to be noted that whilst the 90%ile is used here, other statistical characterizations of the distribution are possible (average, median, etc.). Then the cell coupling values can be stored in an array of (number of cells)×(number of cells).

Figure 5:
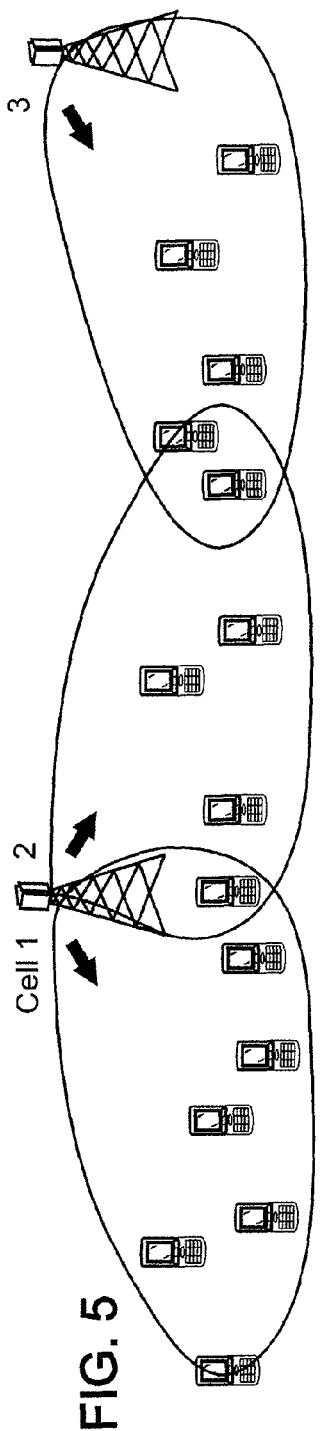
FIG. 5 illustrates the concept of radio cell coupling.

Radio cell coupling is a measure of interaction between any given pair of cells. It can be used to generate neighbor lists and monitor coverage control. Coupling is evaluated by considering the pilot powers measured by UEs who are served by a given radio cell. UEs that see a pilot with similar power to their current server may soon perform a handover to the other cell. This happens in the coverage overlap regions. If there are a significant number of UEs who are located in the overlapping regions between two radio cells, then coupling between these radio cells is high. There has to be coverage overlap and a significant number of UEs in it for sectors to be strongly coupled, as illustrated in FIG. 5. The resulting figure for coupling between two radio cells is by definition 0 dB or less, where 0 dB represents the full coupling of a radio cell with itself.

Once the CCM is created, neighbor lists are then in step 209 directly derived from this matrix. Neighbor lists can be automatically generated from sector coupling data and no further information is needed for this purpose. Neighbors of a given radio cell are deemed to be any other radio cell with coupling greater than a threshold, as illustrated in FIG. 4. A network operator can vary this threshold to change the length of the neighbor list. Too short a list may omit pilots which are strong enough to cause interference, if not detected. Too long a list may result in slow handover problems, since new pilots may not be identified soon enough to allow a handover to take place. It is not necessary to know the locations of each radio cell in order to auto generate neighbor lists.

One potential problem with contemporary systems is that UEs only report pilot strengths for radio cells in their current neighbor list. Therefore in an optimized mode of operation, each radio cell could vary its neighbor list. It would contain a core group of m known neighbors, plus n extra or additional radio cells which would need to be tested, where m and n are positive integers. Thus, in step 211 the neighbor lists are divided into core groups and extra groups. This list of extras could be varied to gather information about all possible neighbors. Each UE served by a given radio cell can potentially be measuring pilots for a different group of extras. If enough evidence is gathered to suggest that one of the extras is good for handover, then it can be added to the core group.

For instance taking the example shown in FIG. 4, and if m=6 and n=2, then the core group for the UE served by cell 5a would consist of cells 5b, 5c, 7b, 8c, 10b and 10c. The additional group would first consist of cells 12b and 13c, which represent the highest coupling figures with cell 5a, when the core group is excluded from consideration. When the neighbor lists are generated next time, then the additional group would consist of cells 1a and 3a which also represent relatively high coupling figures. As far as the additional group is concerned, it is not necessary to consider all the cells in the network, but there could be few, e.g. 6 cell candidates for the additional group so that two of these are in the additional group at a time. There could also be an intelligent algorithm created for selecting the cells in the additional group.

Then in step 213 the neighbor lists are communicated to the relevant BSs and the above steps can be repeated.

In the above exemplary embodiment of the present invention the CCM was derived from a pilot power table. However, there are also other possibilities for creating the table. In future networks requiring handovers between different air interface protocols, the measured pilot power may need to be replaced or supplemented with a measure of what service the neighbor can provide (or has historically provided). The UE can then decide whether it wants to hand over or not to this cell. In a basic cellular system, a pilot power is all that is needed, but where multiple access interface protocols are involved, other metrics such as cost per bit or maximum data rate may be appropriate.

The invention also relates to the corresponding computer program product that is capable of implementing the method in accordance with the embodiments of the invention when loaded and run on computer means of the system. Since majority of the above mentioned steps are performed by the optimization server 101, this program could be running on that server.

FIG. 6 shows a simplified block diagram of the optimization server 101. In FIG. 6 there is shown a receiving unit 601 for receiving measurements from the UEs. The measurements can then be saved in a memory 603. A processor 605 is arranged to process the measurement data for obtaining the PPT and the CCM. There is also shown a determination unit 607 that is arranged to determine the neighbor lists for different cells based on the CCM.

Above an embodiment of the invention was illustrated and described in detail in the drawings and foregoing description, such illustration and description are to be considered illustrative or exemplary and not restrictive; the invention is not restricted to the disclosed embodiment. Other variations to the disclosed embodiment can be understood and effected by those skilled in the art in practicing the claimed invention, from a study of the drawings, the disclosure and the appended claims. For instance, instead of the optimization server 101 creating the neighbor lists, they can be created in the BSs. This would also mean that there is less signaling in the network. However, the signaling is not an issue in the present invention, since the neighbor lists are not created very frequently, for instance once a day. Also, the measurements sent from the UEs do not require lots of signaling.

In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously used.

The invention claimed is:

1. A method of generating neighbor lists in a radio communication network comprising user terminals and base stations defining sectored or omnidirectional radio cells, where communication between user terminals and base stations is arranged to take place over radio channels, the method comprising the steps of:
receiving radio channel measurements from at least some of the user terminals;
creating a first table by using the measurements received from the user terminals, the first table comprising for at least some of the user terminals the corresponding radio channel measurement in relation to different radio cells;
processing the first table to generate a cell coupling matrix comprising a radio coupling figure for each of a plurality of pairs of cells in the network, wherein said processing the first table to generate the cell coupling matrix comprises generating a distribution of relative signal strengths for each of the plurality of pairs of cells, wherein the relative signal strengths correspond to the individual measurements stored in the first table, and wherein said processing the first table to generate the cell coupling matrix comprises deriving the radio coupling figure for each of the plurality of pairs of cells from the respective distribution of relative signal strengths; and
for a certain cell obtaining a neighbor list by determining the radio channel neighbors to be the cells of which the coupling figure with the cell in question is greater than a given threshold.

2. The method according to claim 1, wherein the steps in claim 1 are performed by an optimization server which is either a separate entity in the network or physically located in a base station.

3. The method according to claim 1, wherein the given threshold can be varied in order to change the length of the neighbor list.

4. The method according to claim 1, wherein the radio channel measurements are related to at least one of the following: received signal strengths or quality from the base stations, cost per bit and maximum data rate.

5. The method according to claim 1, further comprising creating for at least some of the cells a core group of known cell neighbors and an additional group of variable cell neighbors.

6. An optimization server for generating neighbor lists in a radio communication network comprising user terminals and base stations defining sectored or omnidirectional radio cells, where communication between user terminals and base stations is arranged to take place over radio channels, the optimization server comprising:
a processor; and
a memory medium coupled to the processor, wherein the memory medium stores program instructions executable to:
receive radio channel measurements from at least some of the user terminals;
create a first table by using the measurements received from the user terminals, the first table comprising for at least some of the user terminals the corresponding radio channel measurement in relation to different radio cells;
process the first table to generate a cell coupling matrix comprising a radio coupling figure for each of a plurality of pairs of cells in the network, wherein said processing the first table to generate the cell coupling matrix comprises generating a distribution of relative signal strengths for each of the plurality of pairs of cells, wherein the relative signal strengths correspond to the individual measurements stored in the first table, and wherein said processing the first table to generate the cell coupling matrix comprises deriving the radio coupling figure for each of the plurality of pairs of cells from the respective distribution of relative signal strengths; and obtain a neighbor list for a certain cell by determining the radio channel neighbors to be the cells of which the coupling figure with the cell in question is greater than a given threshold.

7. The optimization server according to claim 6, wherein the optimization server is either a separate entity in the network or physically located in base station(s).

8. The optimization server according to claim 6, wherein the given threshold can be varied in order to change the length of the neighbor list.

9. The optimization server according to claim 6, wherein the radio channel measurements are related to at least one of the following: received signal strengths or quality from the base stations, cost per bit and maximum data rate.

10. The optimization server according to claim 6, further wherein the program instructions are further executable by the processor to create for at least some of the cells a core group of known cell neighbors and an additional group of variable cell neighbors.

11. A non-transitory, computer accessible memory medium storing program instructions for generating neighbor lists in a radio communication network comprising user terminals and base stations defining sectored or omnidirectional radio cells, wherein communication between user terminals and base stations is arranged to take place over radio channels, and wherein the program instructions are executable to:
    receive radio channel measurements from at least some of the user terminals;
    create a first table by using the measurements received from the user terminals, the first table comprising for at least some of the user terminals the corresponding radio channel measurement in relation to different radio cells;
    process the first table to generate a cell coupling matrix comprising a radio coupling figure for each of a plurality of pairs of cells in the network, wherein said processing the first table to generate the cell coupling matrix comprises generating a distribution of relative signal strengths for each of the plurality of pairs of cells, wherein the relative signal strengths correspond to the individual measurements stored in the first table, and wherein said processing the first table to generate the cell coupling matrix comprises deriving the radio coupling figure for each of the plurality of pairs of cells from the respective distribution of relative signal strengths; and
    obtain a neighbor list for a certain cell by determining the radio channel neighbors to be the cells of which the coupling figure with the cell in question is greater than a given threshold.

12. The non-transitory, computer accessible memory medium according to claim 11, wherein the given threshold can be varied in order to change the length of the neighbor list.

13. The non-transitory, computer accessible memory medium according to claim 11, wherein the radio channel measurements are related to at least one of the following: received signal strengths or quality from the base stations, cost per bit and maximum data rate.

14. The non-transitory, computer accessible memory medium according to claim 11, wherein the program instructions are further executable to create for at least some of the cells a core group of known cell neighbors and an additional group of variable cell neighbors.

* * * * *